United States Patent [19]
Boring

[11] Patent Number: 5,667,546
[45] Date of Patent: Sep. 16, 1997

[54] FITTING FOR CONVEYING GRANULAR MATERIAL

[75] Inventor: Douglas J. Boring, Franklin, Pa.

[73] Assignee: The Conair Group, Inc., Pittsburgh, Pa.

[21] Appl. No.: 610,421

[22] Filed: Mar. 4, 1996

[51] Int. Cl.⁶ .................................................. B01D 46/24
[52] U.S. Cl. .................................................. 55/503; 209/21
[58] Field of Search ........................ 55/498, 503, 505, 55/480; 285/156; 209/21, 22, 23; 210/238

[56] References Cited

U.S. PATENT DOCUMENTS 4,032,310  6/1977  Ignoffo ............................... 55/503
4,477,339  10/1984  Whaley et al. ...................... 290/22
4,502,951  3/1985  Koenig et al. ...................... 290/21

Primary Examiner—Jay H. Woo
Assistant Examiner—Robert A. Hopkins
Attorney, Agent, or Firm—Buchanan Ingersoll, P.C.

[57] ABSTRACT

A fitting is provided to permit granular material carried in an air stream to be deposited within a storage vessel without having the air stream entering the storage vessel itself. The fitting has a tubular filter screen within the housing of the fitting and an air and dust exit port communicates with the filter screen to permit air and dust to be carried through this filter screen and out of the fitting housing. Because of the close proximity of the fitting to the storage vessel, the momentum of the granular material being carried through the fitting deposits the material within the storage vessel.

11 Claims, 2 Drawing Sheets

FITTING FOR CONVEYING GRANULAR MATERIAL

BACKGROUND OF THE INVENTION

1. Field of the Invention

This invention is directed to a fitting that provides a granular material inlet and an air and dust outlet for a granular material storage vessel such is a vessel into which plastic pellets or plastic regrind material is loaded before that material is utilized in an injection molding machine. The fitting provides a material outlet and an air and dust outlet in close proximity to each other whereby the material is conveyed into the vessel while the air stream which conveyed the material is directed through the fitting to a filter or other appropriate mechanism.

2. Description of the Prior Art

Conventionally, granular material is conveyed to material storage vessels through tubes that cause the granular material to enter the storage vessel at one port and then cause the air stream which conveyed the granular material to leave the vessel at a different port in the vessel so that the air stream travels through the vessel. The air stream carrying the granular material to the vessel is created either by forcing compressed air through the system or by drawing a vacuum at some point beyond the vessel and drawing material in an air stream created by that vacuum into the vessel.

In a vacuum conveying system, the granular material is usually conveyed into the vessel through an inlet tube located horizontally in the vessel wall. Conveying air and small particles of dust pass through a filter or screen located above the inlet in the vessel and positioned between the vessel itself and the lid of the vessel. The granular material is retained within the vessel and an air outlet tube from the lid allows the air and dust to pass through vacuum lines to a dust collector and then to a vacuum source such as a vacuum pump. Often, a sequence valve to direct the flow of air and material is mounted within or on top of the lid or located remotely overhead on the main vacuum header line.

Serious disadvantages result in a vacuum conveying system from the present use of separate inlet and outlet ports within the vessel. A sequence valve mounted on the lid of the vessel adds extra height to the overall vessel assembly and adds weight to the lid which makes it more difficult to remove the lid. This extra weight makes it more difficult to remove the filter or screen for cleaning. If the sequence valve is located in the vacuum header line, it is usually 15 to 20 feet above the vessel. This distance makes it difficult to maintain the sequence valve and there is no visual determination of the operation of the sequence valve. With this type of vacuum conveying, the filter screen is usually 9" to 27" in diameter and difficult to clean. It is expensive to manufacture, it is easily damaged, and it is difficult to maintain a vacuum seal around the periphery of the screen.

When granular material is conveyed by pressure such as the use of compressed air, the entry tube to the vessel is usually straight in or is tangential to the cylindrical vessel that has a cone shaped bottom. Cartridge type filters are located at the top of the vessel to trap dust and any material that is carried over by the air. A disadvantage to the pressure conveying systems is that much of the material is carried by the air into the filter cartridge folds which makes the filter cartridge difficult to clean. In addition, most of the vessels with pressure conveying are designed as cyclone separators but they do not effectively operate as such. Accordingly, the effort to produce cyclone separation increases the height of the storage vessel.

SUMMARY OF THE INVENTION

In accordance with the present invention, there is provided a fitting for providing a granular material inlet and an air and dust outlet to a granular material storage vessel which includes an outer housing body having an entry end, an exit end and an air and dust exit port between the entry end and exit end of the housing body. A material inlet tube is sealingly and removably secured to the housing body entry end. A material outlet tube is sealingly and removingly secured to the housing body exit end and communicates with the interior of the granular material storage vessel. A cylindrical filter screen tube is positioned within the outer housing body between the material inlet tube and the material outlet tube whereby material entrained in an air stream and being transported through the material inlet tube enters into the interior of the cylindrical filter screen tube from where the granular material is conveyed through the material outlet tube and air and dust that will pass through the filter screen tube leaves the outer housing body through the air and dust exit port.

Accordingly, an object of the present invention is to provide a single fitting with a combined material and air inlet with an air outlet within the same housing structure.

Another object of the present invention is to utilize inertia to propel a mass of material beyond the normal path of travel of the air exit.

Another object of the present invention is to provide a fitting that requires only one entry/exit port in the storage vessel.

Another object of the present invention is to provide a fitting which has its own self-contained filter screen that may be easily cleaned.

These and other objects of the present invention will become apparent as this description proceeds in conjunction with the following specification, the accompanying drawings and the appended claims.

DESCRIPTION OF THE PREFERRED EMBODIMENT

Figure 1:
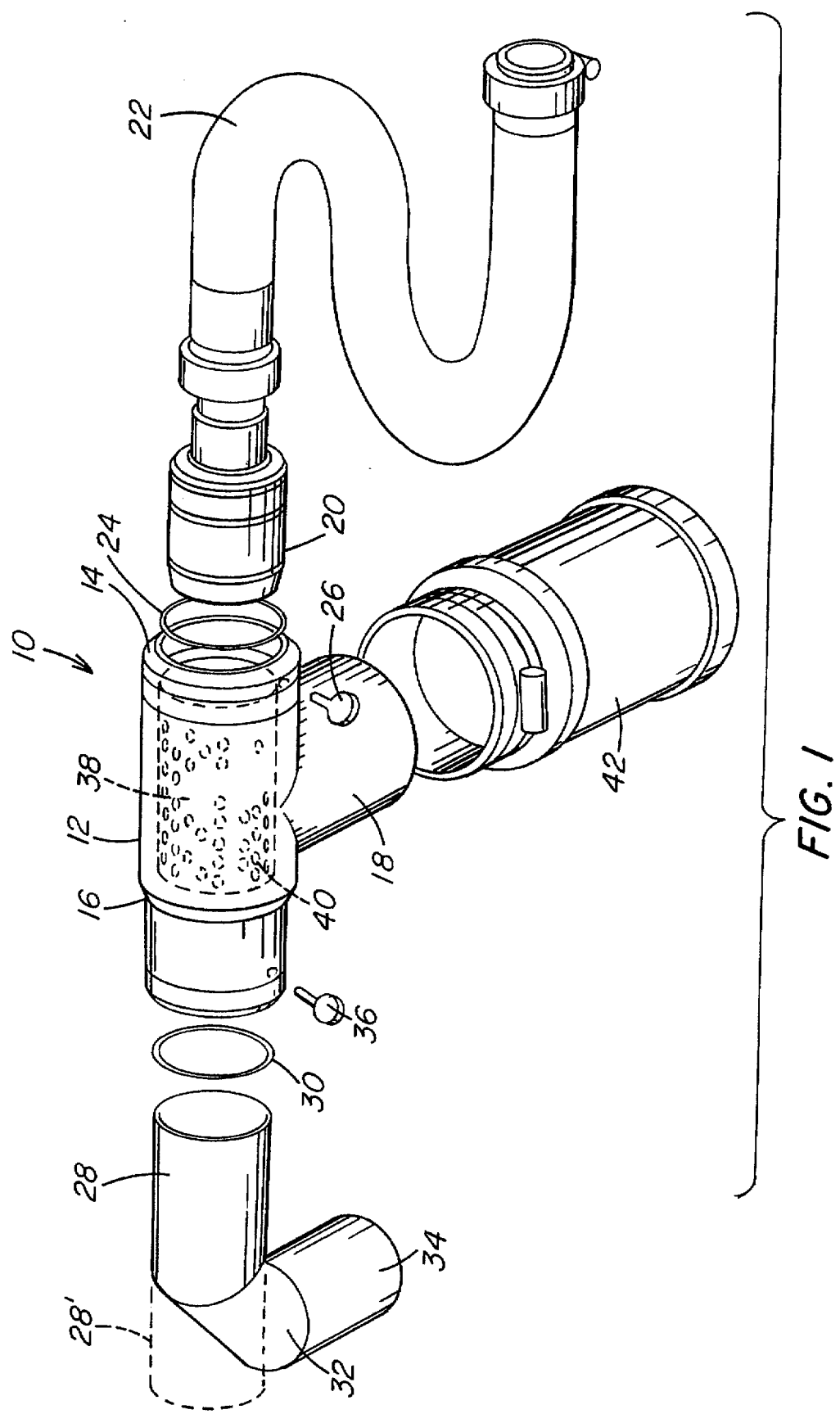
FIG. 1 is an exploded perspective view of the fitting of the present invention showing the individual parts.
Figure 2:
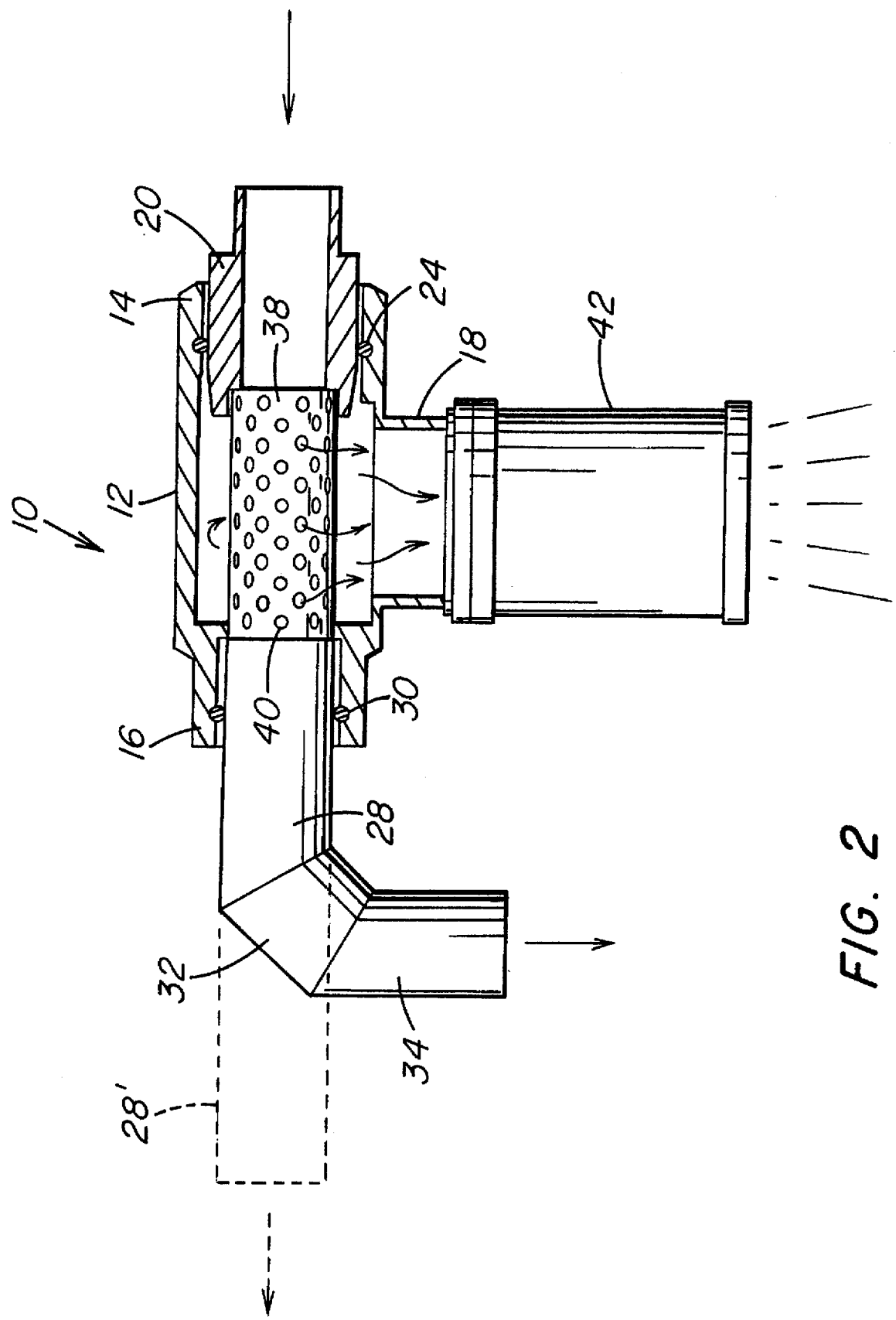
FIG. 2 is a sectional elevation of the fitting of FIG. 1 in the assembled condition.

Referring to the drawings, there is shown a fitting 10 having an outer housing body that has an entry end 14, an exit end 16 and an intermediate air and dust exit port 18. A material inlet tube 20 has flexible tubing 22 attached to it to convey granular material within an air stream to the fitting 10.

An "O" ring 24 seals the material inlet tube 20 within the housing body entry end 14. The material inlet tube 20 is retained within the housing body 12 by set screw 26 so that material inlet tube 20 is easily removable from the housing body 12.

A material outlet tube 28 is sealed within the exit end 16 of outer housing body 12 by O-ring 30. The material outlet tube may have sections 32 and 34 formed on it to change the outlet angle of the tube 28. The outlet tube 28 may also be formed as a straight tube as shown at 28'. A set screw 36 retains the material outlet tube 28 within the outer housing body 12 and permits the tube 28 to be readily removed from the body 12.

A cylindrical filter screen tube 38 is positioned within the outer housing body 12 between the material inlet tube 20 and the material outlet tube 28. The cylindrical filter screen tube may be formed of conventional screen material or it may be a solid tube with a series of small holes 40 formed in it.

As seen in the drawings, the air and dust exit port 18 extends perpendicularly from the outer housing body 12 and receives air and dust that emerges through the cylindrical filter screen tube 38. A filter 42 (FIG. 1) may be secured to air and dust exit port 18 for use when the fitting 10 is utilized with a pressure or compressed air system. When the fitting 10 is utilized with a vacuum system, a sequence valve (not shown) may be secured to the air and dust exit port 18 to control loading of the material into the storage vessel.

From the foregoing, it will be appreciated that with the fitting 10 of the present invention, only one port is actually formed within the storage vessel itself. That single port in the storage vessel receives the material conveyed through the fitting 10 and into the vessel through material outlet tube 28. The air and dust passing through the cylindrical filter screen tube 38 exits the fitting 10 through air and dust exit port 18 into a filter or a sequencing valve. Because of the close proximity of the fitting 10 to the vessel itself, the momentum of the granular material being carried through fitting 10 causes the granular material to enter the vessel while the air and dust is removed before it ever enters the storage vessel so that no exit port is required for air and dust within the storage vessel itself.

According to the provisions of the patent statutes, I have explained the principle, the preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. A three part fitting for providing a granular material inlet and an air and dust outlet to a granular material storage vessel comprising:

a cylindrical outer housing body having an entry end, an exit end, and an air and dust exit port between said entry end and said exit end;

a cylindrical material inlet tube sealingly and removably secured to said housing body entry end;

a cylindrical material outlet tube sealingly and removably secured to said housing body exit end and communicating with said granular material storage vessel;

a removable cylindrical filter screen tube positioned within said outer housing body in contact with said material inlet tube and said material outlet tube whereby granular material entrained in an air stream and being transported through said material inlet tube enters into the interior of said cylindrical filter screen tube from where said granular material is conveyed through said material outlet tube and air and dust that will pass through said filter screen tube leaves said outer housing body through said air and dust exit port and whereby said cylindrical filter screen tube may be removed and replaced for cleaning and repair.

2. The fitting of claim 1 wherein said material inlet tube is sealed to said outer housing by "O" rings.

3. The fitting of claim 1 wherein said material outlet tube is sealed to said outer housing by "O" rings.

4. The fitting of claim 1 wherein said cylindrical filter screen tube is removable from said outer housing for cleaning.

5. The fitting of claim 1 wherein said air and dust exit port is perpendicular to the direction of flow through said cylindrical filter screen tube.

6. The fitting of claim 1 wherein said air stream entraining said granular material is created by compressed air entering said material inlet tube.

7. The fitting of claim 1 wherein said air stream entraining said granular material is created by a vacuum at said air and dust exit port.

8. A three part fitting for providing a granular material inlet and an air and dust outlet to a granular material storage vessel having a material inlet opening comprising:

a cylindrical outer housing body having an entry end, an exit end, and an air and dust exit port between said entry end and said exit end;

a cylindrical material inlet tube removably fitted into said outer housing body entry end and sealed to said outer housing body by "O" rings;

a cylindrical material outlet tube removably fitted into said outer housing body exit end and sealed to said outer housing body by "O" rings with said outlet tube entering said storage vessel material inlet opening;

a removable cylindrical filter screen tube positioned within said outer housing body in contact with said material inlet tube and said material outlet tube whereby granular material entrained in an air stream and being transported through said material inlet tube enters into the interior of said cylindrical filter screen tube from where said granular material is conveyed through said material outlet tube and air and dust that will pass through said filter screen tube leaves said outer housing body through said air and dust exit port and whereby said cylindrical filter screen tube may be removed and replaced for cleaning and repair.

9. The fitting of claim 8 wherein said air and dust exit port is perpendicular to the direction of flow through said cylindrical filter screen.

10. The fitting of claim 8 wherein said air stream entraining said granular material is created by compressed air entering said material inlet tube.

11. The fitting of claim 8 wherein said air stream entraining said granular material is created by a vacuum at said air and dust exit port.

* * * * *